(12) United States Patent
Loktev et al.

(10) Patent No.: US 6,353,707 B1
(45) Date of Patent: Mar. 5, 2002

(54) ELECTRIC HEATING RIBBON WITH MULTIPLE COATING SECTIONS ATTACHED TO RIBBON

(75) Inventors: Irina Loktev; Igor Papirov, both of Jerusalem (IL)

(73) Assignee: Ceramitech, Inc., Brooklyn, NY (US)

( * ) Notice: Subject to any disclaimer, the term of this patent is extended or adjusted under 35 U.S.C. 154(b) by 0 days.

(21) Appl. No.: 09/225,945

(22) Filed: Jan. 6, 1999

Related U.S. Application Data

(60) Provisional application No. 60/070,890, filed on Jan. 9, 1998.

(51) Int. Cl.⁷ ................................................. H05B 3/00
(52) U.S. Cl. ...................... 392/435; 219/213; 219/542; 219/552; 219/544; 219/549; 392/480; 338/284; 338/289; 338/293; 338/295; 338/210; 338/280
(58) Field of Search ................................. 219/539, 542, 219/552, 541, 532, 213, 466.1, 530, 540, 553, 544, 549, 528; 338/284, 289, 291, 293, 295, 280, 281, 306–309, 210–211; 392/435, 472, 432–434, 480

(56) References Cited

U.S. PATENT DOCUMENTS

| | | | |
|---|---|---|---|
| 1,175,433 A | | 3/1916 | Goetsch |
| 1,226,627 A | | 5/1917 | Barnum |
| 1,928,142 A | * | 9/1933 | Trent et al. .................. 338/284 |
| 2,022,314 A | | 10/1935 | Heyroth et al. |
| 2,360,266 A | | 10/1944 | Osterheld |
| 2,559,077 A | | 7/1951 | Johnson et al. |
| 2,597,338 A | | 5/1952 | Kohring |
| 2,600,486 A | | 6/1952 | Cox |
| 2,856,496 A | * | 10/1958 | Fisher ......................... 338/284 |
| 2,938,103 A | | 5/1960 | Crump |
| 2,941,176 A | | 6/1960 | Jacoby |

(List continued on next page.)

FOREIGN PATENT DOCUMENTS

| | | | |
|---|---|---|---|
| CA | 1015017 | 8/1977 | |
| CH | 410219 | 10/1966 | |
| DE | 1540067 | 12/1969 | |
| DE | 2949511 | * 6/1981 | |
| EP | 184 520 | 6/1986 | |
| FR | 1 305 123 | 1/1963 | |
| FR | 2 106 106 | 4/1972 | |
| GB | 719318 | * 12/1954 | ................ 219/552 |
| GB | 2228165 | * 8/1990 | |
| JP | 3-67484 | * 3/1991 | |
| JP | 3-84889 | * 4/1991 | |
| JP | 3-171585 | * 7/1991 | |
| JP | 4-14791 | 1/1992 | |
| SU | 1239898 | * 6/1986 | ................ 219/552 |
| SU | 1532980 | * 12/1989 | ................ 338/280 |
| WO | 97 16052 | 5/1997 | |

*Primary Examiner*—John A. Jeffery
(74) *Attorney, Agent, or Firm*—R. Neil Sudol; Henry D. Coleman; William J. Sapone

(57) ABSTRACT

An electric heating device includes a flexible resistor ribbon, a plurality of sections of electroconductive coating attached to the resistor ribbon at preset intervals, and connector contacts coupled to the resistor ribbon for enabling connection of a power source to the resistor ribbon. The resistor ribbon has a high specific impedance. The flexible resistor ribbon is attached to a rigid or flexible flat base panel for incorporation into a building as a floor, wall or ceiling panel. Layers of electric insulation are attached to the base so as to sandwich the flexible resistor ribbon. Where the resistor ribbon is bent back on itself, for example, to form a snaking configuration, a strip of two-sided adhesive tape is attached to the layers of electric insulation and to the ribbon at multiple spaced points. In an alternative specific configuration of the heating device, the flexible resistor ribbon and the sections of the electroconductive coating are disposed inside a hose made of thermo-shrink plastic foil and provided with external markings indicating bending sites at locations of the sections of the electroconductive coating.

39 Claims, 4 Drawing Sheets

U.S. PATENT DOCUMENTS

| | | | |
|---|---|---|---|
| 3,033,970 A | | 5/1962 | Eisler |
| 3,118,042 A | * | 1/1964 | Parker .................. 219/552 |
| 3,179,544 A | * | 4/1965 | Johannsen ............. 219/543 |
| 3,266,661 A | | 8/1966 | Dates |
| 3,316,390 A | | 4/1967 | Gaugler et al. |
| 3,387,248 A | * | 6/1968 | Rees ..................... 219/549 |
| 3,417,229 A | * | 12/1968 | Shompho ............... 219/542 |
| 3,423,574 A | | 1/1969 | Shomphe et al. |
| 3,539,767 A | * | 11/1970 | Eisler .................... 392/435 |
| 3,546,432 A | * | 12/1970 | Eisler .................... 392/435 |
| 3,584,198 A | | 6/1971 | Dol et al. |
| 4,057,707 A | | 11/1977 | Allen |
| 4,058,704 A | | 11/1977 | Shimizu |
| 4,176,445 A | | 12/1979 | Solow |
| 4,220,846 A | | 9/1980 | Rice et al. |
| 4,281,238 A | | 7/1981 | Noma et al. |
| 4,297,670 A | | 10/1981 | Solow |
| 4,334,350 A | | 6/1982 | Rice et al. |
| 4,467,311 A | | 8/1984 | Person et al. |
| 4,529,958 A | | 7/1985 | Person et al. |
| 4,551,614 A | | 11/1985 | Johnson |
| 4,574,186 A | | 3/1986 | Sakai et al. |
| 4,581,522 A | | 4/1986 | Graham |
| 4,588,976 A | * | 5/1986 | Jaselli ................... 338/284 |
| 4,659,906 A | * | 4/1987 | Furtek ................... 392/435 |
| 4,710,612 A | | 12/1987 | Lin et al. |
| 4,717,812 A | * | 1/1988 | Makita ................... 219/528 |
| 4,908,599 A | | 3/1990 | Breen et al. |
| 5,519,191 A | * | 5/1996 | Ketcham et al. ......... 219/552 |
| 5,624,750 A | * | 4/1997 | Martinez et al. ......... 219/542 |
| 5,824,996 A | * | 10/1998 | Kochman et al. ......... 219/529 |

* cited by examiner

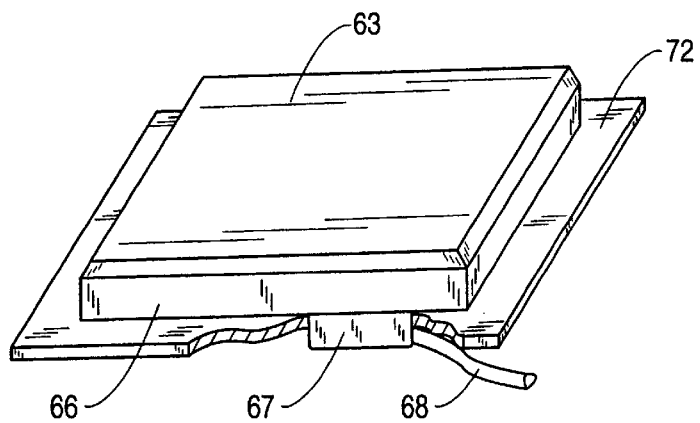
FIG. 10
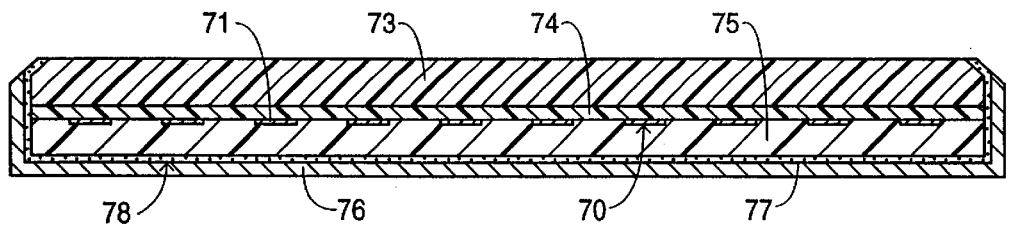
FIG. 11
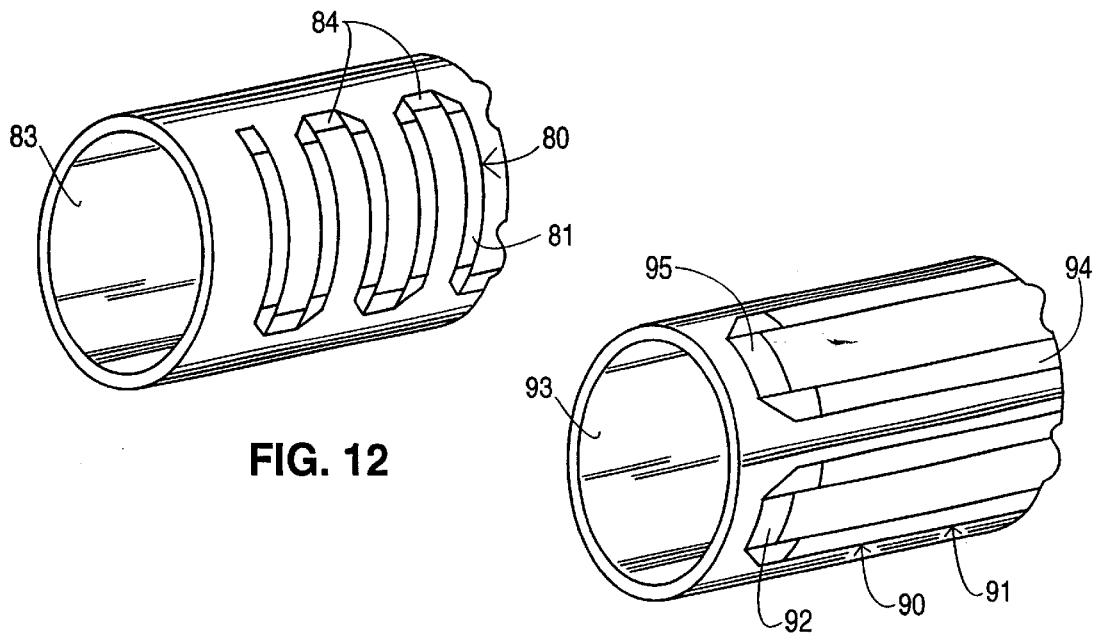
FIG. 12
FIG. 13

ELECTRIC HEATING RIBBON WITH MULTIPLE COATING SECTIONS ATTACHED TO RIBBON

CROSS-REFERENCE TO A RELATED APPLICATION

This application relies for priority purposes on U.S. provisional application No. 60/070,890 filed Jan. 9, 1998.

TECHNICAL FIELD

The present invention generally relates to the area of electric heating elements. More particularly, the present invention relates to electric heating elements for use in heating residential and non-residential premises, specifically via construction panels and components such as walls and floors, etc., or different industrial or agricultural installations.

BACKGROUND OF THE INVENTION

Previously known heating elements based on applying a thin metal coating to a resistor ribbon are disclosed in U.S. Pat. No. 4,839,500. The thin metal coating can be made of several different metals, such as tungsten, tantalum, molybdenum, titanium, or platinum. The coating can be formed by chemical processes including the following: vapor-phase deposition method, sputtering method, vapor deposition method (U.S. Pat. No. 5,331,134). A number of patents also disclose the use of metal oxides in making the thin metal coating, e.g., a tin oxide coating (U.S. Pat. Nos. 4,889,974; 5,304,783; 5,616,266).

Other known types of heating elements are built using film printing technique as set forth in U.S. Pat. No. 5,068,517. The heating element is based on a silver-palladium alloy (AgPd) or a mixture of the silver-palladium alloy (AgPd) and ruthenium oxide ($RuO_2$). The cover layer has a thickness of 10 mm. The heating elements of that type have relatively small overall dimensions. According to the patent specifications, the heating element is 270 mm long by 15–25 mm wide.

A number of problems are typically encountered in the practical use of such heating elements in heating installations. There is a need to use special subtle chemical technologies for applying a thin coating. It has been found particularly problematic to apply an even coating throughout the entire surface of the element. Moreover, such thin coatings have a short life. Also, the coatings are also made from expensive metals. In addition, the heaters thus manufactured are limited in size and power.

Another known type of heating device is based on a heating element made of metal foil as disclosed in U.S. Pat. No. 4,797,537; U.S. Pat. No. 4,889,973; EP 0227624 A1; EP 0175662 A1. All of these patents disclose metal foil-based heating devices manufactured by etching or punching. The etching method is applicable only in manufacturing heating elements of limited size. Heaters utilizing such elements are applicable, on the whole, in localized heating in determinate places. These heaters have good results for creating temperature zones of limited size within relatively small, confined spaces. Since the etching agent is not washed away after the etching process, the metal remains brittle and easily destructible, limiting the life-span of the heating element. Elements made using the punching method are similarly limited in size and can be used for small-capacity heaters only. Both methods also entail additional expenses with respect to heating material.

Another known type of heater utilizes a foil made of a highly conductive material, namely, aluminum (WO 9603013 A1, WO 05/22236, U.S. Pat. No. 4,574,186). The specific electric resistance of aluminum is lower than the specific resistance of the resistor alloy by a factor of 40 to 50. Therefore, the thickness of the foil is smaller (microns), and the foil is short lived.

A number of patents have been issued for methods of strengthening existing heating elements (U.S. Pat. No. 4,650,960), and of reinforcing them (U.S. Pat. No. 4,363,947) regardless of the technology used. The latter patent proposes a technology for strengthening a heating element (U.S. Pat. No. 4,025,863) by soldering reinforcing elements thereto. The problem, however, is that the use of a foil of lead-tin antimony alloy having a melting point of 180° C. is proposed for the method in question. Lead, in addition to being an environmental pollutant, is very expensive.

All of the above described heating devices have a limited scope of practical application and a limited size and shape. In addition, the prior art heating devices are too complicated to make and require rare and expensive materials. Another problem is their limited lifespan.

The present invention, therefore, aims to allow the manufacture of more versatile two- and three-dimensional heating elements with larger effective heating surfaces (or practically unlimited shapes and sizes), with the added benefit of an increased life-span. All these goals can be attained using the proposed new electric heating element, intended for incorporation into different construction panels and materials for reliable electric heating.

SUMMARY OF THE INVENTION

An electric heating device in accordance with the present invention comprises a resistor ribbon, a plurality of sections of electroconductive coating attached to the resistor ribbon at preset intervals, and connector contacts coupled to the resistor ribbon for enabling connection of a power source to the resistor ribbon. Because of its thinness, the ribbon is naturally flexible.

Preferably, the flexible resistor ribbon has a high specific impedance. Also, where the flexible resistor ribbon has a width, each of the sections of the electroconductive coating are at least coextensive with the flexible resistor ribbon across the width thereof. It is generally contemplated that the sections of electroconductive coating, which are spaced from one another along the length of the ribbon, each have a length which is greater than the width of the ribbon. Thus, where the flexible resistor ribbon is folded back on itself at bend points located only at the sections of the electroconductive coating, the flexible resistor ribbon is mechanically reinforced at all the bend points by the sections of the electroconductive coating and electrical current is shunted across the bend points via the sections of the electroconductive coating, thereby eliminating overheating at the bend points.

The electroconductive coating of the spaced coating sections is generally the only layer of electroconductive coating which is applied to the resistor ribbon. The sections of coating in accordance with the present invention are spaced from each other by predetermined intervals or distances. These intervals or distances are determined by the expected use of the ribbon, and more particularly, by the expected locations of bending of the ribbon to conform to the size and shape of a preselected substrate.

The specific impedance of the resistor ribbon preferably adheres to the following formula R1/R2>2, where R1 is the specific impedance of the flexible resistor ribbon and R2 is a specific impedance of the electroconductive coating.

Where the heating device has a rated operational current $I_{element}$ and the electroconductive coating has a maximum admissible current $I_{max}$, a ratio between the rated operational current $I_{element}$ and the maximum admissible current $I_{max}$ adhering to the formula:

$$I_{element}/I_{max} < \frac{1}{2}.$$

In accordance with another feature of the present invention, the heating device further comprises a substrate, for example, a flat base to which the flexible resistor ribbon is attached. The base may be rigid or flexible and made of any of a variety of fire-resistant or fireproof materials including, without limitation, linoleum, PVC, plastic, fiberglass, or ceramic tile. In this form, the heating device is suitable for incorporation into a building as a floor, wall or ceiling panel.

Layers of electric insulation are advantageously attached to the base so as to sandwich the flexible resistor ribbon. Where the resistor ribbon is bent back on itself, for example, to form a snaking configuration, a strip of two-sided adhesive tape may be attached to the layers of electric insulation and to the ribbon at multiple spaced points in order to counteract differential thermal expansion of the various components of the heating device.

In a specific configuration of the heating device, a plate is connected to the base parallel thereto. The flexible resistor ribbon is mounted on a back side of the plate between the plate and the base. The heating device in that case also comprises layers of electric insulation attached to the base, the flexible resistor ribbon being disposed between the base and the layers of electric insulation.

In an alternative specific configuration of the heating device, a first layer of electric insulation is attached to a back side of the base. The flexible resistor ribbon is mounted on the first layer of electric insulation, while a second layer of electric insulation is positioned over the flexible resistor ribbon and the first layer of electric insulation. A metal casing is attached to the second layer of electric insulation and the base. A supplemental layer of insulation may be interposed between the second layer of electric insulation and the metal casing. In addition, the metal casing may incorporate connectors for operably connecting the metal casing to a power source. In that event, the metal casing and the connector means may comprise a seamless integral body. Where the metal casing incorporates a heat radiator, the metal casing and the heat radiator comprise a seamless integral body.

In another alternative specific configuration of the heating device, the base includes flexible electric insulation layers. The flexible electric insulation layers are selected from the group consisting essentially of plastic film and rubber sheeting.

In yet another alternative specific configuration of the heating device, the device further comprises an outer jacket or covering, the flexible resistor ribbon and the sections of the electroconductive coating being disposed inside the outer jacket or covering. The outer jacket or covering is preferably made of thermo-shrink plastic foil and is provided with external markings indicating bending sites at locations of the sections of the electroconductive coating.

In accordance with the present invention, a method for manufacturing an electric heating device utilizes a base having a sandwich assembly connected thereto. The sandwich assembly includes a first layer of electric insulation, a second layer of electric insulation and a resistor ribbon disposed therebetween, the sandwich assembly having a back side opposite the base. Pursuant to the inventive method, a thin electroconductive layer is applied to side edges of the base and the back side of the sandwich assembly. Then, the base together with the sandwich assembly and the electroconductive layer are electroplated to create a seamless metal casing attached to the base and the sandwich assembly.

The base with the sandwich assembly attached thereto may be manufactured by mounting the first layer of electric insulation to one side of the base, attaching the resistor ribbon to the first layer of electric insulation, and mounting the second layer of electric insulation to the first layer of electric insulation over the resistor ribbon.

In accordance with another feature of the present invention, the method of manufacture further includes the step of fitting an additional waterproof layer onto a back surface of the second layer of electric insulation. In that case, the waterproof layer is part of the sandwich assembly and the back side of the sandwich assembly is a surface of the waterproof layer. Then, the thin electroconductive layer is applied onto the surface of the waterproof layer.

The method of manufacture may further comprise the steps of applying a thick layer of a quick-melting, waterproof substance onto the sandwich assembly at a desired connection point of a power cable to the resistor ribbon, and sculpting the thick layer into a desired shape of a connector box. In this case, the thin electroconductive layer is applied also to the sculpted layer of the quick-melting, waterproof substance and the sculpted layer is also electroplated so that the seamless metal casing incorporates the connector box. In a subsequent step, the metal casing is heated to melt the quick-melting substance out of the metal casing to form the connector box.

Where the attaching of the resistor ribbon to the first layer of electric insulation includes bending the resistor ribbon at bend points, the resistor ribbon being provided with spaced sections of electroconductive reinforcement coating located at the bend points, the bending of the resistor ribbon includes bending the sections of the coating at the bend points.

A method of heating a building structure comprises, in accordance with the present invention, providing a flexible resistor ribbon mounted to an electric insulating material and to a building panel, mounting the panel to the building structure, and applying power to the flexible resistor ribbon to heat the panel and the building structure. The method may include mounting the flexible resistor ribbon to the electric insulating material and to the panel. The panel may be a wall panel or a floor panel.

An electric heating device comprises, in accordance with the present invention, a flexible resistor ribbon having high electrical impedance and including a first face mounted onto an insulated material and a second face mounted onto a substrate for direct heating thereof. The substrate may be ceramic, flexible or rigid plastic, leather or fabric. The second face of the ribbon may be wrapped around the substrate, woven into the substrate, molded into the substrate, or glued onto the substrate.

A heating device in accordance with the present invention facilitates the manufacture of more versatile two- and three-dimensional heaters with larger effective heating surfaces. The heating device permits the production of heaters of practically unlimited shapes and sizes. Life-span is increased over conventional heating devices incorporating resistor ribbons.

A heating element and particularly a resistive ribbon thereof in accordance with the present invention can be made of less expensive materials, for example, foil made from economically alloyed metal.

Heating devices in accordance with the invention may be manufactured easily via automation. The heating devices are versatile, reliable and cost-efficient.

Heating devices incorporating, in accordance with the present invention, a resistive ribbon with spaced electroconductive coating sections and a ceramic base with an external metal casing feature enhanced mechanical strength, fire and water resistance.

The present invention provides technical solutions which are innovative and capable of meeting the requirements for their application. The technical solutions are fit for industrial production, and as formulated in the present patent application, constitute a coherent invention.

BRIEF DESCRIPTION OF THE DRAWINGS

Other advantages of the present invention will be readily appreciated as the same becomes better understood by reference to the following detailed description when considered in connection with the accompanying drawings wherein:

FIG. 10 is a schematic perspective view of the electric heating device of FIG. 9, modified to incorporate an additional radiator, in accordance with the present invention;

FIG. 11 is a schematic cross-sectional view similar to FIGS. 3, 7, 8, and 9, showing an electric heating device with a rigid ceramic base and a seamless metal casing with an additional electroconductive layer for electroplating, in accordance with the present invention.

FIG. 12 is a schematic perspective view of a heating device in the form of a pipe provided with a snaking resistive ribbon, in accordance with the present invention; and FIG. 13 is schematic perspective view of another heating device in the form of a pipe provided with a snaking resistive ribbon, in accordance with the present invention.

DETAILED DESCRIPTION OF THE INVENTION

Figure 1:
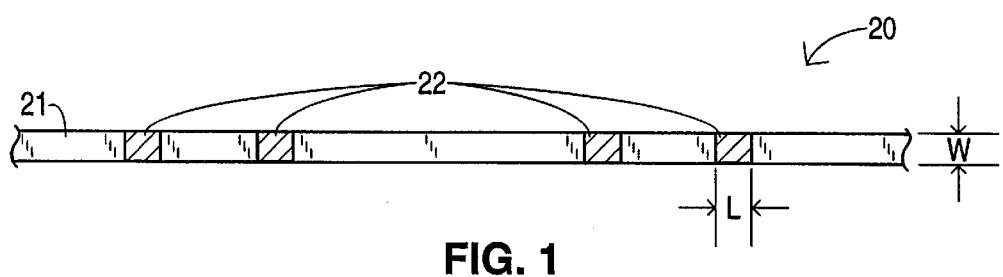
FIG. 1 is a schematic top plan view of an electric heating ribbon made from metallic foil with interspaced sections of electroconductive coating, in accordance with the present invention.

FIG. 1 illustrates an elongate electric heating element 20 includes a flexible resistor ribbon 21 made from thin metallic resistor foil. This flexible resistor ribbon 21 is provided with sections 22 of electroconductive coating material applied to the ribbon at pre-set intervals or distances. Such coating sections 22 are located at points where ribbon 21 is to be bent or folded for assembly into a heating device.

Coating sections 22 allow a bending or folding of heating element 20 without breaking and without overheating in the event of superpositions of such bent sections. Thus, coating sections 22 perform two functions simultaneously. On the one hand, sections 22 reinforce resistive ribbon 21 while improving plasticity, bendability, and flexibility. On the other hand, coating sections 22 shunt the flow of electric current through overlapping layers of resistor ribbon 21, thus eliminating local overheating at the bending points. Such overheating can occur in the absence of electric conductivity between the bent sections of ribbon 21; for instance, when ribbon 21 is covered with a thin layer of non-conductive oxides or with insulation, which is a common practice with strip heaters.

The ability of the element 20 to bend at pre-set locations along its length allows for heating devices of very complex shapes to be built, regardless of size.

Electroconductive coating sections 22, as well as the very thin principal coating of electroconductive material (not separately illustrated), can be made of several different metals, such as copper, silver, gold, or platinum. The coating sections 22 can be formed by electrochemical electroplating. In using this method, the coating of sections 22 is applied on both sides of ribbon 21, improving the overall reliability of heating element 20.

Each electroconductive coating section 22 has a length L which equals or exceeds the width W of ribbon 21. As shown in FIG. 1, coating sections 22 are coextensive with ribbon 21 in the transverse direction, i.e., sections 22 are of the same width W as ribbon 21. The specific impedance of the electroconductive coating of sections 22 is substantially lower than the specific impedance of resistor ribbon 21, while the maximum permissible electric current of element 20 is considerably more than the nominal current of resistor ribbon 21. More particularly, where resistor ribbon 21 has a specific electric impedance R1 and coating sections 22 have a specific electric impedance R2, a ratio R1/R2 of these impedances is greater than 2. In addition, the ratio $I_{element}/I_{max\ cover}$ is less than ½, where $I_{element}$ is the rated current of the heating element 20 and where $I_{max\ cover}$ is the maximum permitted electric current of the coating sections 22.

Figure 2:
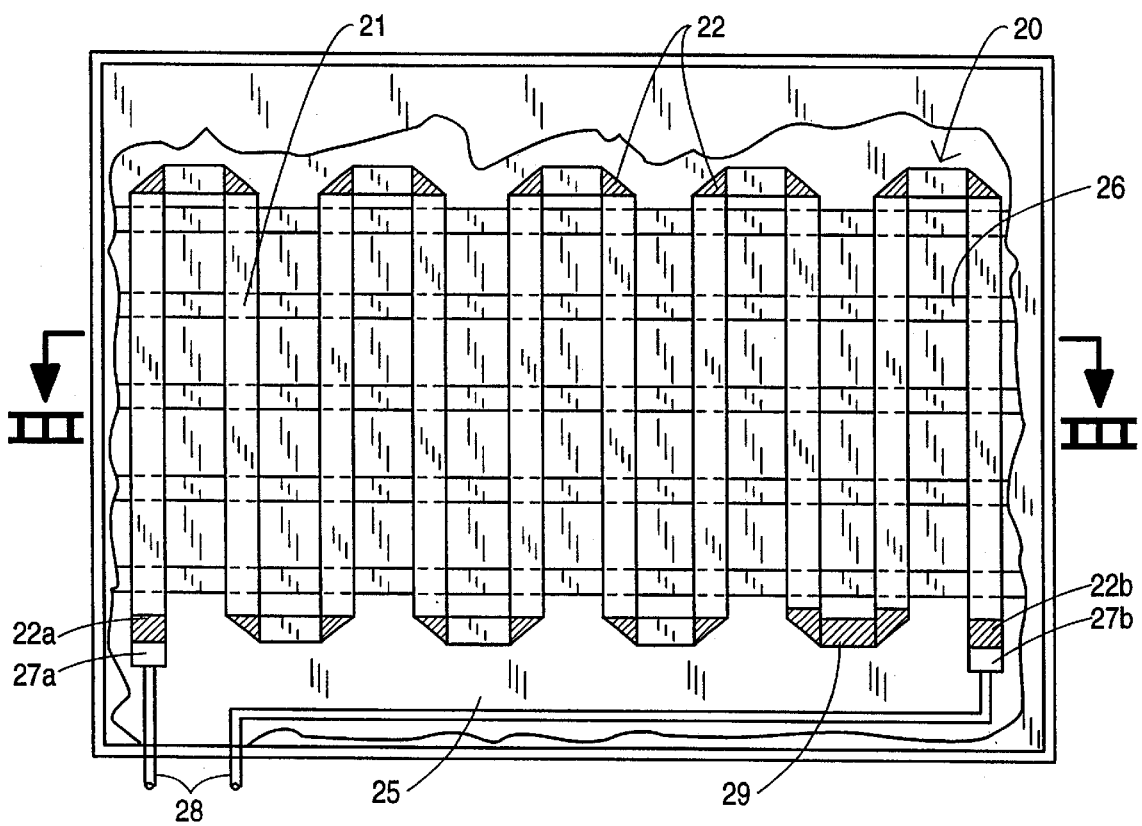
FIG. 2 is a schematic top plan view of an electric heating device having a rigid ceramic tile base and the heating ribbon of FIG. 1 bent back on itself at multiple locations, in accordance with the present invention.
Figure 3:
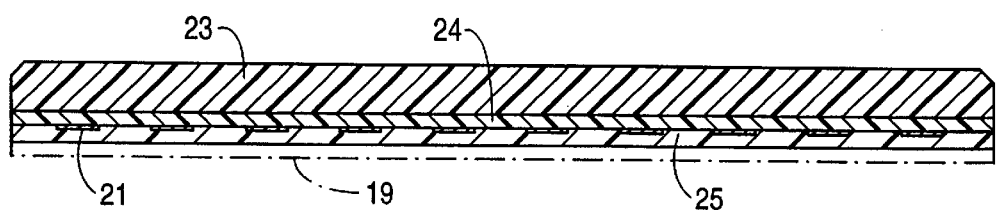
FIG. 3 is a schematic cross-sectional view taken along line III—III in FIG. 2.

Heating element 20 is a core component of a number of household heating devices, designed to be built into floor and wall panels and used for heating the interior air. FIGS. 2 and 3 illustrate one such panel. The panel includes a rigid flat base 23 made, for instance, of a ceramic tile, a back side of which is covered with layers 24 and 25 of electric insulation. Heating element 20 is sandwiched between electric insulation layers 24 and 25 in such a way that bending points of heating element 20 fall exactly within the sections 22 of electroconductive coating.

It is to be noted that base 23 may be made alternatively of a flexible material such as plastic, linoleum, fiberglass, etc. Preferably, the material of base 23 is fire-resistant or fire-proof.

As illustrated in FIG. 2, heating element 20 may be fastened to electric insulation layer 25 (and layer 24) in part by strips 26 of two-sided adhesive tape. Each strip or tape 26 is disposed between layers 24 and 25 and crosses the bent heating element 20 at several locations. Strips or tapes 26 are made of thermo-resistant materials including thermo-resistant glue and serve to compensate for differences in thermal expansion coefficients of the various components of the heating panel of FIGS. 2 and 3.

As further illustrated in FIG. 2, heating element 20 has terminals 27a and 27b which are connected to a source of electrical current (not shown) via a cable 28. Terminals 27a and 27b are operatively or conductively connected to ribbon 21 at respective coating sections 22a and 22b. As indicated at 29, electroconductive coating sections 22 may be sufficiently long to permit the locating of two bend points of resistive ribbon 21 in proximity to one another, thereby facilitating the assembly of heating element 20 into a snaking configuration as shown in FIG. 2.

Hard plastic can also be used for making the base 23, the polymeric material acting as both a construction or support material and an electric insulator. In a modified embodiment of a heating device, heating element 20 is sandwiched between separate layers of the plastic or polymeric base. Pursuant to that modification, insulation layers 24 and 25 (FIG. 3) are also made of plastic and can be viewed as parts of the same plastic base. A layer of thermal insulation 19 material can be disposed on one of the surfaces of the plastic base. Other suitable materials include leather and fabric.

Figure 4:
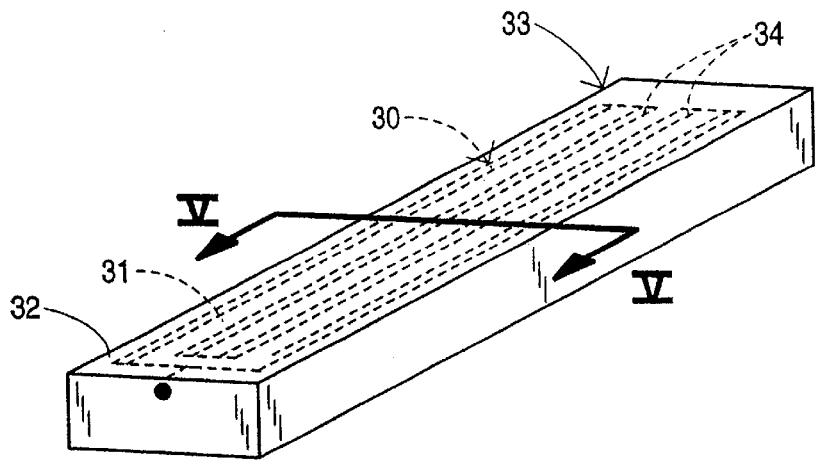
FIG. 4 is a schematic perspective view of an electric heating device mounted into a plastic shell, in accordance with the present invention.
Figure 5:
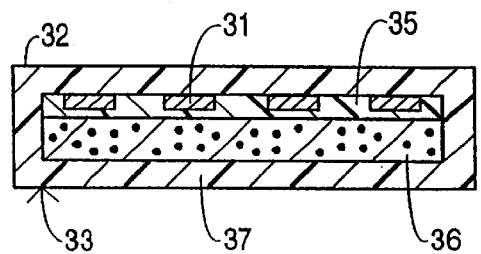
FIG. 5 is a transverse cross-sectional view of the heating device and plastic shell of FIG. 4, taken along line V—V in that figure.

FIGS. 4 and 5 depict another embodiment of a heating device which incorporates a heating element 30 in the form of a resistor ribbon 31 with spaced sections of electroconductive coating. As depicted in FIGS. 4 and 5, heating element 30 is attached to a rigid base 33 built from profiled plastic, for example, in the form of a plastic box of rectangular cross-section, joined together to form a hollow duct. Heating element 31 is mounted on a back side of a front plate 32 of box-shaped base 33. Plate 32 thus serves as a heat radiating surface, and is covered on its back side with an electric insulation layer 35. The heating device of FIGS. 4 and 5 is assembled in such a way that each bending point 34 of heating element 30 falls within a section of the electroconductive coating. A space between insulation layer 35 and a back plate 37 of plastic box-shaped base 33 can be left empty (as an air bubble), or alternatively, filled with a layer of thermal insulation material 36. In the former case, air vents (not shown) can be provided in the back plate 37 of the box-shaped base 33 to permit free air flow. This embodiment of the heating device with an air bubble in the back of the shell or box-shaped base 33 can be used for wall paneling (such as built-in wall heaters). In the second case, where thermal insulation layer 36 is provided, the electrical heating device is suitable for building into floor or wall panels. These heating devices can be installed under all kinds of fixed surfaces inside a house, as well as under a road surface for de-icing purposes.

A base or support for heating element 20 or 30 can assume any kind of three-dimensional shape. The base or support can also be flexible, with the heating element 20 or 30 squeezed between layers of plastic film or rubber sheeting.

Figure 6:
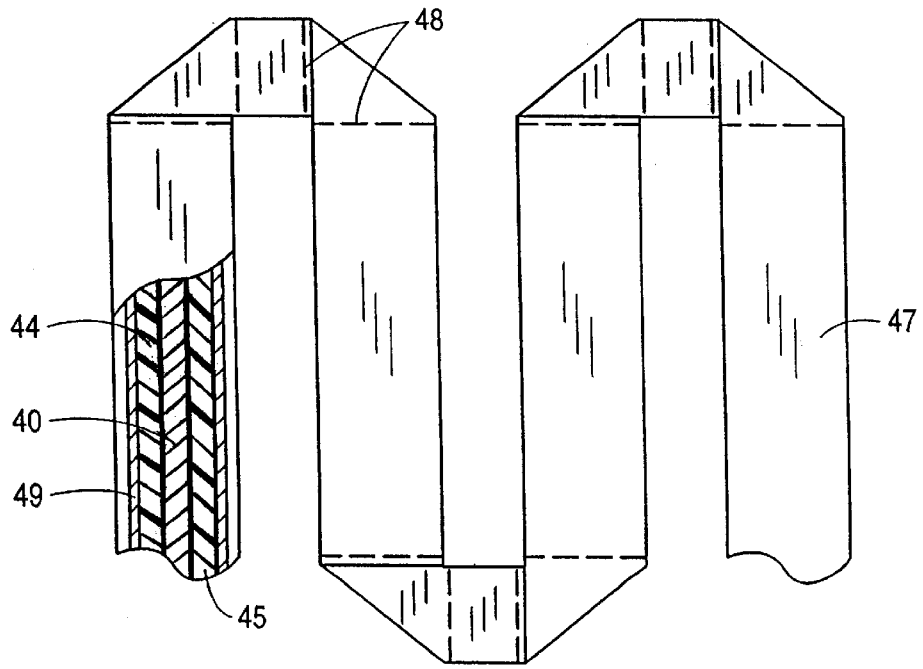
FIG. 6 is a schematic top plan view of a heating device with a tubular casing in accordance with the present invention.

Heating element 20 may be incorporated into other kinds of heating devices, for example, an elongate heating strip as illustrated in FIG. 6. A resistive heating element 40 similar or identical to heating element 20 is sandwiched between two electric insulation layers 44 and 45. The resulting multi-layered assembly is then fitted into a flexible outer jacket or covering 47, made of waterproof and fireproof material. The most suitable material for outer jacket or covering 47 is thermo-shrink plastic, which fits snugly onto insulation layers 44 and 45 and resistive element 40. Along an outside surface, outer jacket or covering 47 has special markings 48, indicating the locations of spaced sections of electroconductive coating of resistive heating element 40. Heating element 40 can be bent or folded only at those locations. Extra tensile strength and protection against accidental damage may be provided by an optional layer of extra-strong, bullet-proof material 49 under the thermo-shrink plastic outer jacket or covering 47.

Figure 7:
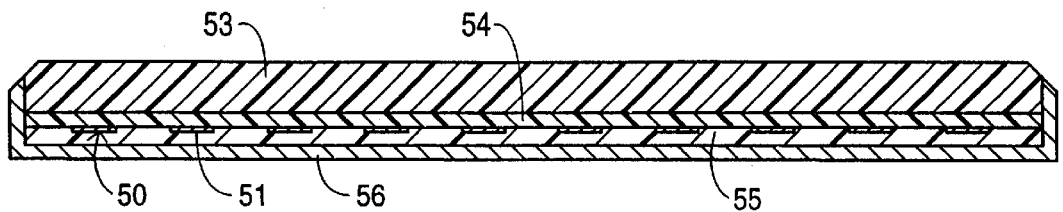
FIG. 7 is a schematic cross-sectional view similar to FIG. 3, showing an electric heating device with a rigid ceramic base and a metal casing, in accordance with the present invention.

FIG. 7 illustrates an electric heating device based on the above-described heating element, featuring a base 53 made of a ceramic tile, a flexible or rigid plastic or other fire-resistant or fireproof material. A heating element 50 comprising a resistive ribbon 51 provided with spaced sections of an electroconductive coating (not shown) is sandwiched between a first electric insulation layer 54 and a second electric insulation layer 55 and is applied to a back side of base 53. A metal casing 56 is firmly secured to the second insulation layer 55 and side edges of the base 53 and serves to provide structural reinforcement for the entire assembly as well as water and fire resistance.

Figure 8:
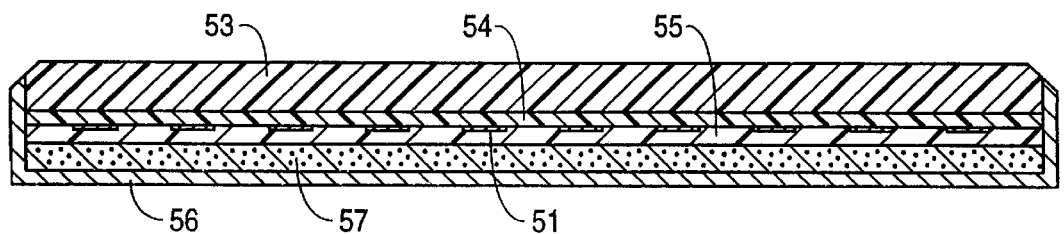
FIG. 8 is a schematic cross-sectional view similar to FIG. 7, showing a modification of the electric heating device of that drawing figure, in accordance with the present invention.

To reduce heat flow from the back side of the heating device of FIG. 7, the heating device can also feature a layer of thermal insulation 57 fitted between the second electric insulation layer 55 and the casing 56, as illustrated in FIG. 8.

Figure 9:
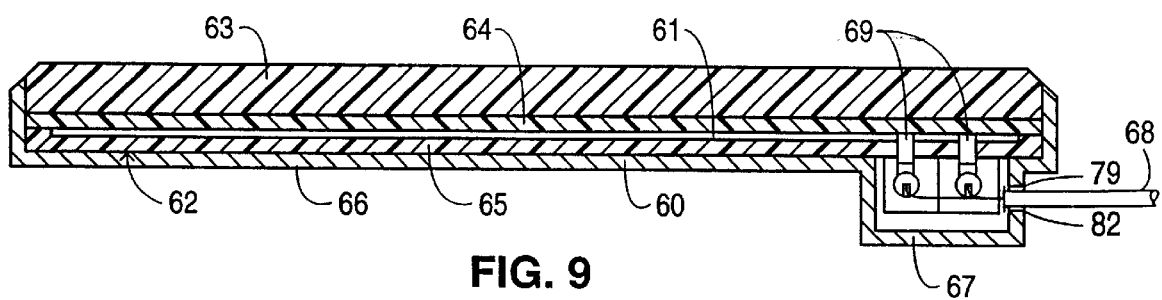
FIG. 9 is a schematic cross-sectional view similar to FIGS. 3 and 7, showing an electric heating device with a rigid ceramic base and a seamless metal casing incorporating a power cable connector box, in accordance with the present invention.

FIG. 9 shows another electric heating device comprising a ceramic or polymeric base 63 carrying a sandwich assembly 62 on a rear side of the base. Sandwich assembly 62 includes a first electric insulation layer 64 and a second insulation layer 65 between which a multiply folded electric heating element 60 is disposed. As discussed above with respect to other embodiments of a heating device, heating element 60 comprises a folded resistive ribbon 61 provided at spaced intervals with an electroconductive coating (not shown) for structural reinforcement and current shunting purposes. A metal casing 66 is attached to a rear side of sandwich assembly 62, as well as to lateral sides of the sandwich assembly and base 63. Casing 66 is formed with an integral connector box 67 for a power cable 68. Power cable 68 is connected to heating element 60 via copper foil terminals 69 connected to resistor ribbon 61 under the insulation layer 65 inside connector box 67.

As illustrated in FIG. 10, the electric heating device of FIG. 9 may be modified so that metal casing 66 is provided with an integral metal radiator 72 designed to enhance the transmission of heat from a tile or panel containing the heating element to neighboring regular tiles or panels which are not provided with a heating element. This modification of the heating device allows a reduction in the number of heating panels needed to heat the same floor area.

FIG. 11 illustrates an electric heating device similar to the device of FIGS. 3, 7, 8, and 9 and additionally illustrates a method of manufacturing an electric heating device in the form of a floor or wall panel. The heating device of FIG. 11 comprises a rigid base 73 made of a ceramic or polymeric material. A heating element 70 comprising a resistive ribbon 71 provided with spaced sections of an electroconductive coating (not shown) is sandwiched between a first electric insulation layer 74 and a second electric insulation layer 75 and is applied to a back side of base 73. A seamless metal casing 76 is firmly secured to the second insulation layer 75 and side edges of the rigid base 73 and serves to provide structural reinforcement for the entire assembly as well as water and fire resistance. Casing 76 is applied to the assembly by electroplating techniques. More specifically, a thin electroconductive layer 77 is applied to side edges of rigid base 73 and a rear surface of a multi-layer sandwich structure 78 including insulation layers 74 and 75 and heating element 70. The whole assembly, including base 73, sandwich assembly 78 and electroconductive layer 77, is lowered into an electroplating bath and connected to a cathode, so that casing 76 is formed as a galvanized metal layer firmly attached to base 73. Owing to the electroconductivity of the side edge coating, casing 76 provides a snug and airtight protection to the entire multi-layer assembly, including the rigid base.

In the cases when an extra layer of thermal insulation, e.g., 57 in FIG. 8, is fitted between the last layer of electric insulation 55 and the metal casing 56, the back surface of the thermal insulation 57 is covered with a waterproof coating (not shown). The side edges of the base 53 and the waterproof coating are then covered with an electroconductive layer in an electrolytic bath and connected to a cathode, with the seamless metal casing 56 being formed as a galvanized metal layer firmly attached to the base 53.

The electroplating method described above with reference to FIG. 11 allows also for the integration of connector box 67 (FIG. 9) into the respective seamless metal casing 66. In this method, copper terminals 69, power cable 68, and a sealing wall or partition 82 together are covered with an extra thick layer of quick-melting, waterproof substance, most commonly wax, which is sculpted into the desired shape of connector box 67. The side edges of base 63, the surface of the sculpted quick-melting, waterproof substance, and the back surface of electric insulation layer 65 are then covered with a layer of electroconductive coating (e.g., 77) and lowered into an electrolytic bath, with a resulting galvanized metal layer forming seamless metal casing 66 incorporating connector box 67 for power cable 68. Lastly, the quick-melting substance is melted from connector box 67 through a cable orifice 79.

Thus, owing to the above-described features and qualities, electric heating element 20, 30, 40, 50, 60, 70 can be bent or folded up without any danger of mechanical damage, failure, or overheating at the places of bending, which allows it to be used in building two- or three-dimensional heating installations with a large heating surface in practically unlimited shapes and sizes, combined with greater mechanical strength and total elimination of overheating at the places of bending.

As illustrated in FIG. 12, an installation for modifying the temperature of a flowable composition such as water includes an elongate heating element 80 partially wrapped in a snaking configuration around a hose, pipe, or other conduit type substrate or base 83. Additionally, heating element 80 can be woven, molded to, or glued to substrate or base 83. Heating element 80 comprises a resistor ribbon 81 provided at spaced intervals with sections 84 of electroconductive coating.

FIG. 13 illustrates another heating device for modifying the temperature of a flowable composition such as water. An elongate heating element 90 in the form of a resistive ribbon 91 having spaced sections of electroconductive coating at which locations the ribbon is bent or folded to form a snaking pattern with long longitudinal segments 94 and short circumferential segments 95. Heating element 90 is attached by molding, weaving, or gluing to a cylindrical surface of a hose, pipe or other conduit type substrate or base 93.

It is also possible to build heating element bases or substrates of flexible electric insulation materials, such as polymer film or rubber sheeting. A folded or bent resistive-ribbon-type heating element is sandwiched between layers of such sheeting in such a way that the bending points of the heating element fall within sections of electroconductive coating.

Bases or substrates 23, 33, 53, 63, 73, 83 and 93 mechanically reinforce and improve the water and fire-resistance of the respective heating devices. Where extra layer 57 (FIG. 8) of thermal insulation material is sandwiched between outer insulation layer 55 and metal casing 56, heat loss from the non-radiating side of the heating device is reduced.

Resistive ribbons 21, 31, 51, 61, 71, 81, and 91 may be made of any number of alloys, particularly iron-based alloys, which exhibit sufficient plasticity and strength to permit manufacture of a thin ribbon having a high specific electric impedance. One such alloy or group of alloys has the following component elements with the relative weights listed in percentage of total weight:

| | |
|---|---|
| Chromium | 13.5%–15.5% |
| Aluminum | 4.5%–6.0% |
| Silicon | 0.3%–1.2% |
| Titanium | 0.2%–0.6% |
| Iron (with impurities) | the remainder. |

In this alloy, the chromium content and the aluminum content are related to one another by the inequality:

$$49 < \%Cr + 6 \cdot (\%Al) < 50.$$

With the chromium content and the aluminum content determined by this relationship, high rigidity of the material and satisfactory plasticity are ensured.

Specific electric impedance of this alloy depends in large part on silicon content. An incremental increase in specific electric impedance $\Delta R$ relative to the same alloy except with a minimal silicon content is related to silicon content by the following expression:

$$\Delta R = (1.0 + 1.2 \cdot (\%Si)) \cdot 0.1 \text{ mOhm·m}.$$

The silicon content may be raised to 1.2%. Further increase in silicon content reduces potential deformation of the alloy under cold rolling.

Increasing the aluminum content of this alloy up to 6.0% results in an increase in specific electric impedance. Further increasing the aluminum content results in a drop in plasticity, militating against the production of very thin foil.

It is to be noted that the base to which the resistive heating element 20 is attached may be flexible and made of a fire-resistant or fireproof material such as linoleum, fiberglass or plastic. It is to be noted further that heating element 20, as well as terminals 27a and 27b (FIG. 2) and a busbar portion of cable 28, 69, may be attached, in a first step of a manufacturing process, to a carrier or support layer (not shown) in the form of a mesh. This mesh, with the folded heating element 20 20 and terminals 27a, 27b (or 69) and the busbar, becomes an insert which may be later sandwiched between linoleum layers (not shown). Of course, the mesh insert may be alternatively disposed between electric insulation layers 24 and 25 and attached to a rigid or flexible base of fire-resistant or fireproof material. This method of manufacture facilitates the use of robotic assembly machines at all stages of the manufacturing process. The insert may be produced uniformly in rolls for later sandwiching between layers of insulating material or base material in a continuous process.

The invention has been described in an illustrative manner, and it is to be understood that the terminology which has been used is intended to be in the nature of words of description rather than of limitation. Clearly, many modifications and variations of the present invention are possible in light of the above teachings. For example, double-sided adhesive strips 26 need not extend orthogonally with respect to main segments of snaking heating element 20, as illustrated in FIG. 2. The strips may extend at an acute angle relative to the long main segments of snaking heating element 20. The multiple strips 26 may themselves be segments of a single continuous strip of double-sided adhesive tape which is folded or bent back on itself to produce a snaking configuration similar to the snaking configuration of heating element 20.

Accordingly, it is to be understood that the invention can practiced otherwise than as specifically described.

What is claimed is:

1. An electric heating device, comprising:

a flexible resistor ribbon including an elongate linear or straight segment of metal foil;

at least three sections or layers of electroconductive coating preformed on said linear or straight segment of said flexible resistor ribbon at preset intervals; and connector contacts coupled to said flexible resistor ribbon for enabling connection of a power source to said flexible resistor ribbon.

2. An electric heating device, comprising:

a flexible resistor ribbon in the form of an elongate metal foil;

a plurality of at least three sections or layers of electroconductive coating preformed on said linear or straight segment of said flexible resistor ribbon at preset intervals; and connector contacts coupled to said flexible resistor ribbon for enabling connection of a power source to said flexible resistor ribbon, said flexible resistor ribbon being folded back on itself at bend points located only at said sections or layers of said electroconductive coating, so that said flexible resistor ribbon is mechanically reinforced at all said bend points by said sections or layers of said electroconductive coating and so that electrical current is shunted across said bend points via said sections or layers of said electroconductive coating, thereby eliminating overheating at said bend points.

3. The electric heating device of claim 2, wherein said flexible resistor ribbon has a high specific impedance.

4. The electric heating device of claim 2, wherein said flexible resistor ribbon has a width, each of said sections or layers of said electroconductive coating being at least coextensive with said flexible resistor ribbon across said width thereof.

5. The electric heating device of claim 2, wherein said specific impedance adheres to the following formula:

$$R1/R2 > 2$$

where R1 is the specific impedance of said flexible resistor ribbon and R2 is a specific impedance of said electroconductive coating.

6. The electric heating device of claim 5, wherein the heating device has a rated operational current $I_{element}$ and said electroconductive coating has a maximum admissible current $I_{max}$, a ratio between said rated operational current $I_{element}$ and said maximum admissible current $I_{max}$ adhering to the formula:

$$I_{element}/I_{max} < 1/2.$$

7. The electric heating device of claim 2, further comprising a flat base, said flexible resistor ribbon being attached to said base.

8. The electric heating device of claim 7, wherein said base is made of plastic or ceramic tile.

9. The electric heating device of claim 8, further comprising layers of electric insulation attached to said base.

10. The electric heating device of claim 9, wherein said layers of electric insulation sandwich said flexible resistor ribbon.

11. The electric heating device of claim 10, further comprising a strip of two-sided adhesive tape attached to said flexible resistor ribbon and said layers of electric insulation.

12. The electric heating device of claim 11, wherein said flexible resistor ribbon is folded back on itself at bent points located only at said sections or layers of said electroconductive coating, said strip of two-sided adhesive tape being attached to said flexible resistor ribbon at multiple spaced points.

13. The electric heating device of claim 8, further comprising a plate connected to said base parallel thereto, said flexible resistor ribbon being mounted on a back side of said plate between said plate and said base, also comprising layers of electric insulation attached to said base, said flexible resistor ribbon being disposed between said base and said layers of electric insulation.

14. The electric heating device of claim 7, further comprising a first layer of electric insulation attached to a back side of said base, said flexible resistor ribbon being mounted on said first layer of electric insulation, a second layer of electric insulation being fitted over said flexible resistor ribbon and said first layer of electric insulation, a watertight electroplated metal casing being attached to said second layer of electric insulation and said base.

15. The electric heating device of claim 14, wherein a layer of thermal insulation is fitted between said second layer of electric insulation and said metal casing.

16. The electric heating device of claim 15, wherein said metal casing incorporates connector means for operably connecting said resistor ribbon to an electrical power source.

17. The electric heating device of claim 16, wherein said metal casing and said connector means comprise a seamless integral body.

18. The electric heating device of claim 16, wherein said metal casing incorporates a heat radiator.

19. The electric heating device of claim 18, wherein said metal casing and said heat radiator comprise a seamless integral body.

20. The electric heating device of claim 7, wherein said base includes flexible electric insulation layers.

21. The electric heating device of claim 20, wherein said flexible electric insulation layers are selected from the group consisting essentially of flexible plastic film and rubber sheeting.

22. The electric heating device of claim 2, further comprising an outer jacket or covering, said flexible resistor ribbon and said sections or layers of said electroconductive coating being disposed inside said outer jacket or covering.

23. The electric heating device of claim 22, wherein said outer jacket or covering is made of thermoshrunk plastic foil.

24. The electric heating device of claim 23, wherein said outer jacket or covering is provided with external markings indicating bending sites at locations of said sections or layers of said electroconductive coating.

25. The electric heating device of claim 2, wherein said flexible resistor ribbon has a width and wherein said sections or layers each have a respective length extending longitudinally along said flexible resistor ribbon, said length being at least as long as said width, each of said sections or layers of said electroconductive coating being at least coextensive with said flexible resistor ribbon across said width thereof.

26. An electric heating device, comprising:
   a flexible resistor ribbon;
   a plurality of sections of electroconductive coating attached to said flexible resistor ribbon at preset intervals, said flexible resistor ribbon being folded back on itself along fold lines extending through or in said sections of said electroconductive coating; and
   connector contacts coupled to said flexible resistor ribbon for enabling connection of a power source to said flexible resistor ribbon.

27. The electric heating device of claim 26, wherein a strip of two-sided adhesive tape is attached to said flexible resistor ribbon at multiple spaced points.

28. The electric heating device of claim 26, wherein said flexible resistor ribbon has a width, each of said sections of said electroconductive coating being at least coextensive with said flexible resistor ribbon across said width thereof.

29. The electric heating device of claim 26, further comprising a flat base, said flexible resistor ribbon being attached to said base.

30. The electric heating device of claim 26, wherein said flexible resistor ribbon has a width and wherein said sections each have a respective length extending longitudinally along said flexible resistor ribbon, said length being at least as long as said width, each of said sections of said electroconductive coating being at least coextensive with said flexible resistor ribbon across said width thereof.

31. An electric heating device, comprising:
   a thin metal flexible resistor ribbon having a substantially uniform width;
   a plurality of sections of electroconductive metal coating attached to said flexible resistor ribbon at preset intervals, each of said sections of said electroconductive metal coating being at least coextensive with said flexible resistor ribbon across said width thereof; and
   connector contacts coupled to said flexible resistor ribbon for enabling connection of a power source to said flexible resistor ribbon, said flexible resistor ribbon being folded back on itself at bend points located only in said sections of said electroconductive coating, so that said flexible resistor ribbon is mechanically reinforced at all said bend points by said sections of said electroconductive coating and so that electrical current is shunted across said bend points via said sections of said electroconductive coating, thereby eliminating overheating at said bend points.

32. The electric heating device of claim 31, further comprising a flat base, said flexible resistor ribbon being attached to said base.

33. The electric heating device of claim 32, wherein said base is made of plastic or ceramic tile.

34. The electric heating device of claim 33, further comprising layers of electric insulation attached to said base.

35. The electric heating device of claim 34, wherein said layers of electric insulation sandwich said flexible resistor ribbon.

36. The electric heating device of claim 35, further comprising a strip of two-sided adhesive tape attached to said flexible resistor ribbon and said layers of electric insulation.

37. An electric heating device, comprising:
   an elongate, smoothly continuous flexible resistor ribbon made of a first material having a high specific impedance;
   a plurality of spaced sections or layers of electroconductive coating electroplated on said flexible resistor ribbon at two preset intervals, so that said sections or layers of said electroconductive coating are disposed in pairs spaced along a length of said flexible resistor ribbon, the members of each said pair being spaced from one another by a distance smaller than a distance between adjacent pairs of said sections or layers of said electroconductive coating, said sections or layers of said electroconductive coating being made of a second material of a low specific impedance; and
   connector contacts coupled to said flexible resistor ribbon for enabling connection of a power source to said flexible resistor ribbon.

38. An electric heating device, comprising:
   a flat base;
   layers of electric insulation attached to said base;
   a plurality of segments of flexible resistor ribbon attached at least indirectly to said base, said segments of ribbon extending substantially parallel to one another in spaced relation to one another; and
   at least one strip of two-sided adhesive tape attached to said layers of electric insulation and to said segments of ribbon, said tape extending substantially perpendicularly to said segments of ribbon, said flexible resistor ribbon being a single continuous strip of ribbon provided with multiple spaced sections of electroconductive coating, said continuous strip being folded back on itself at bend points located only at said sections of said electroconductive coating to thereby form said segments of ribbon.

39. The electric heating device of claim 38, wherein said layers of electric insulation sandwich said segments of ribbon.

* * * * *